G. W. BELL.
MEANS FOR CONTROLLING PNEUMATIC ANTIVIBRATION DEVICES FOR AUTOMOBILES.
APPLICATION FILED DEC. 8, 1914.
1,289,039.
Patented Dec. 24, 1918.
3 SHEETS—SHEET 1.
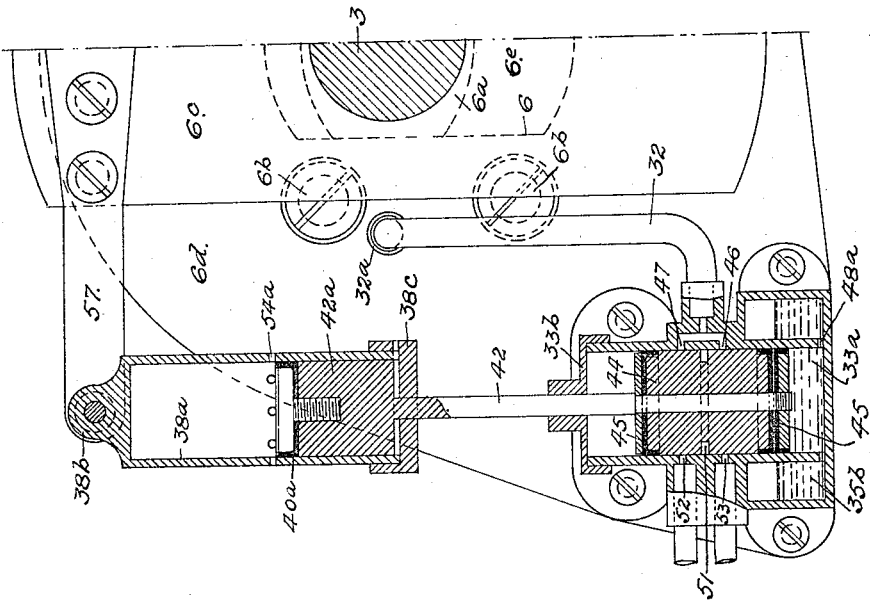
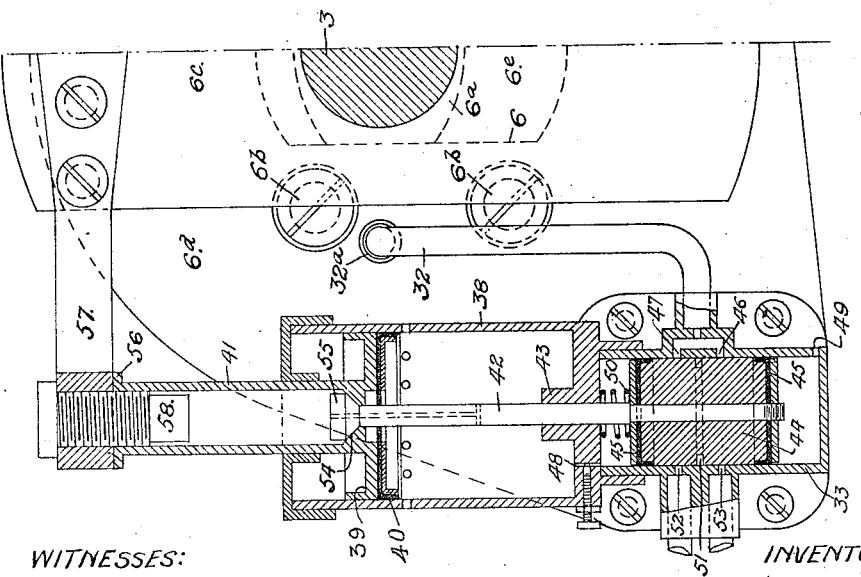

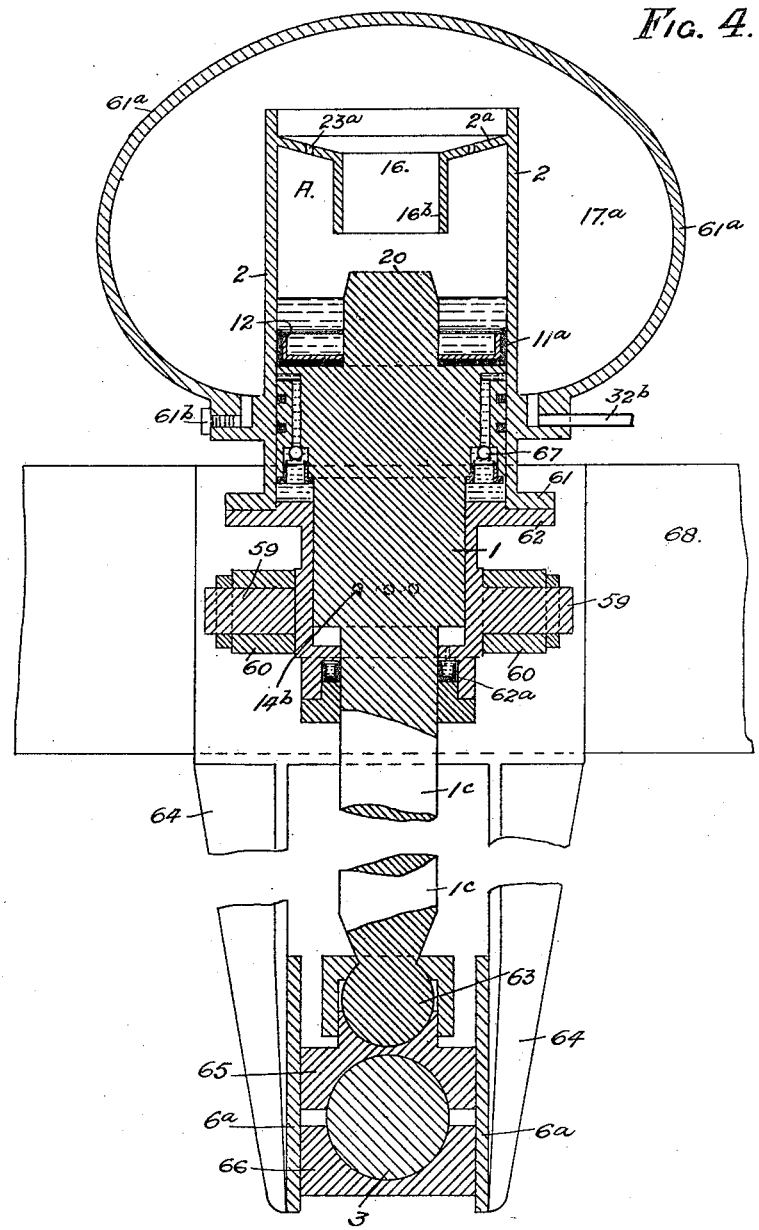

UNITED STATES PATENT OFFICE.

GEORGE WILLIAM BELL, OF LIVERPOOL, ENGLAND.

MEANS FOR CONTROLLING PNEUMATIC ANTIVIBRATION DEVICES FOR AUTOMOBILES.

1,289,039.　　　Specification of Letters Patent.　　Patented Dec. 24, 1918.

Application filed December 8, 1914. Serial No. 876,175.

*To all whom it may concern:*

Be it known that I, GEORGE WILLIAM BELL, a subject of the King of England, residing at 97 Newsham Drive, Liverpool, in the county of Lancaster, England, have invented certain new and useful Improvements in or Connected with Means for Controlling Pneumatic Antivibration Devices for Automobiles, of which the following is a specification, being a continuation in part of applicant's Patent No. 1,120,011, issued December 8, 1914.

This invention relates to anti-vibration devices for automobiles of the piston plunger and cylinder type disposed conveniently to support the weight of the body and load either between the wheels and axles, axles and bodies, or wheels and bodies of the vehicles, and is more particularly applicable to the type of device having a predetermined displacement constrained by the action of a dash-pot provided at the opposite end of the cylinder of the device to that containing air under pressure supporting the vehicle and load; and my invention has for its object to provide simple and accessible means of automatically controlling the pressure and column of air in the said device to the variation of the load without being affected by the average load shock and vibration; such automatic control therefore maintaining the piston in the cylinder of the device in a predetermined position, and exerting a practically constant resistance during vibration or undulatory movement of the axle or wheels, so that any change in the load automatically causes the pressure to be regulated to meet the said variation. Furthermore to restore the piston to its normal position of suspension, and further to regulate the degree of cushioning at predetermined position of displacement, so that the suspension shall be "sensitive" to the absorption of small irregularities of the road surface, and at the same time prevent concussion or shock should the vehicle meet with obstructions which would necessitate a larger displacement than that provided in the device for absorption, and also prevent shock due to sudden collapse of the air pressure sustaining the load in the device from any cause.

Broadly, according to my invention, I maintain the air control valve which communicates with the suspension device (when said valve has been actuated through the relative motion of the piston and cylinder of same) in the position to which it has been moved by means of friction, with the object of insuring that the said valve shall at all times remain in the position to which it has been moved; and I positively close said valve when open to pressure through a non-elastic or substantially non-elastic connection only when the said piston has approximately reassumed its normal position of suspension in the device; the construction and arrangement of the parts being preferably such that the travel or motion of the valve shall be as small as practicable to assist in effecting the objects in view, and to obviate undue wear and tear.

My invention is shown in the accompanying drawings, in which—

Figure 1 is a vertical section through a control valve of the type hereinbefore described, adapted to be disposed between the axle and wheel and secured to the guide plate of the cylinder of the device and the dust plate.

Fig. 2 is a vertical section similar to Fig. 1, showing a modified arrangement.

Fig. 4 is a longitudinal section of "suspension" of the type hereinbefore described, disposed between the axle and body of the vehicle.

Like characters of reference denote like parts.

Figure 3:
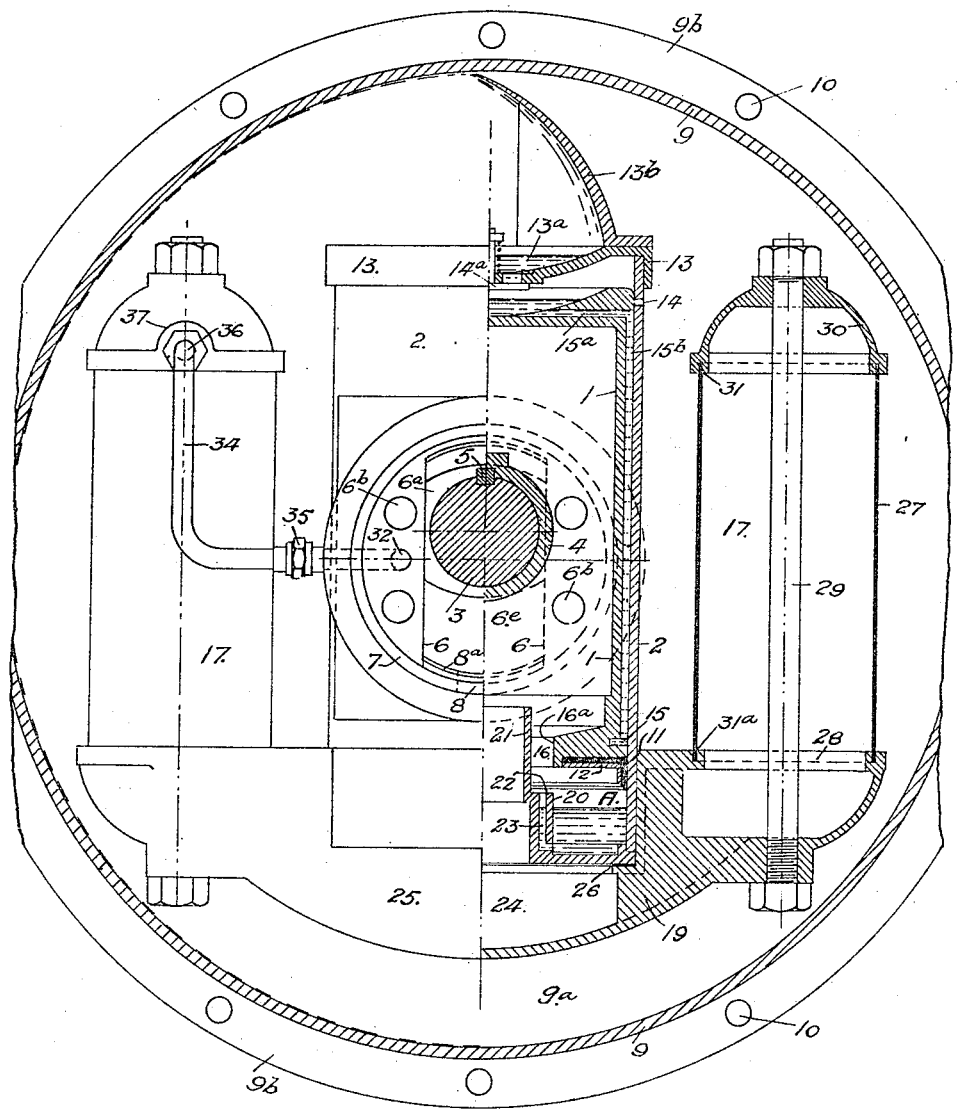
Fig. 3 is a longitudinal section of "suspension" of the type hereinbefore described, adapted to be disposed in the plane of the wheel of the vehicle.

Referring first to Figs. 1 and 3 wherein one arrangement of my invention is illustrated:—

To provide a simple form of construction of both axle and the respective parts and elements of the hub, and at the same time afford a quick method of readily detaching the wheel from the axle, the upper and lower portions of the cylinders are cast integral with one another.

I provide an axle 3 each end of which is adapted to receive a piston 1 which has a hollow cross boss 4, into which the axle 3 accurately fits, the piston being prevented from rotating by means of a key 5.

In order that the piston may be held securely in its correct position endwise, I provide sleeves 6ª which also act as slipper blocks in guides 6 of the wheel hub cylinder trunnions 7. The sleeve 6ª presses against a dust plate covering the slot or guide opening 6ᶜ. The sleeve 6ª is provided on the outside with flat vertical faces sliding on the guides 6; at the lower part there are ports 8 communicating with the lower outside face of the cylinder 2 and the hub 9, through which oil escaping from the cylinder 2 may fall to the inner surface of the hub 9.

The outer end of the axle 3 is provided with a nut securing the sleeve 6ª to the piston, and therefore holding the wheel 9 and the axle 3.

The guides 6, in which the sleeves 6ª slide may be independent members in the form of castings fitted into the bore of the trunnions 7. Each guide 6 is held in correct parallel alinement with the cylinder 2 by means of stud bolts 6ᵇ, passing through the body of the guide 6 on opposite sides of the slot, and screwed into the body of the cylinder 2.

Sleeves or slippers 6ª are able to find correct alinement in the guides 6, by adjustment on the axle 3.

The hub portion of the wheel 9 rotates on bushed or ball bearings on the outside periphery of the trunnions 7. Access to the interior of the outer hub or wheel center 9 is obtainable by the removal of one of the side plates 9ª of the same, which are secured and held concentrically on the hub 9 by bolts 10; 9ᵇ represents a hub flange adapted to receive the spokes of the wheel.

Piston 1 is provided on its lower end with suitable air tight packing 11 preferably of the cup leather type, (in some cases piston rings may also be used in conjunction therewith) which packing is held in position by a washer 12.

At the upper ends of the piston 1 and cylinder 2 there is provided a single dashpot formed by the upper face of the piston 1 and the concave cap 13 which is in communication with said dash-pot through a valve 14ª located at the bottom of the reservoir 13ª, said dash-pot also being in communication with the groove 15 at the back of the cup leather 11 of the piston 1 by passages 15ª and ducts or grooves 15ᵇ on the face of the piston 1.

The lower face of the piston 1 is provided with a centrally disposed aperture 16, affording air communication between the interior of the piston 1 and the cylinder 2, and also an air reservoir 17 connected therewith by passages 19. At the bottom of the cylinder, I provide a tube 20 concentric with the said cylinder and extending from the bottom of the latter into the aperture 16 of the piston 1. This tube is arranged to have its lower portion 20 accurately telescope with wall 16ª of the aperture 20, the upper portion of said tube forming a ferrule 21 of lesser diameter, and connected to the lower and larger diameter portion 20 at a shoulder 22. On the outer face of the ferrule 20, I provide one or more vertical conduits 23 to give vent to air and oil from the annular space A formed by the wall of the cylinder 2 and said tube 20, when the piston 1 descends to the lower portion of its stroke, such oil lodging in the space 16 or inside the lower face of the piston 1.

To increase the volume of air contained in the piston 1 and cylinder 2, (where it is desired to increase the "sensitiveness" of the suspension) the reservoir 17 communicates with the said piston and cylinder through the tube 21, and passages 19, and chamber 24 formed in the bottom cap 25 which is secured to the cylinder 2 and made air tight by a flange-joint 26. The reservoir 17 is in this case formed of cylindrical shells 27 disposed in the plane of the wheel in such a manner that the outer hub 9 may incase the same. The cylinders 27 are secured to the false bottoms 25 in the openings 28 by bolts 29 and caps 30, the latter being made air tight by means of joints 31 and 31ª.

In lieu of this arrangement, the reservoir may in some cases be formed or made integral with the cylinder 2 and adapted to occupy the whole or part of the space in the hub 9 on each side of the cylinder 2 in the plane of the wheel. Suitable passages being provided at the bottom of the said cylinder to afford free communication between the reservoir and the cylinder.

In order to provide means for renewing or supplying the proper amount of oil (in those cases in which there is no oil forced automatically to the front or high pressure side of the piston packing) to the annular space or dash-pot A, without in any way taking the hub or cylinder apart, I may provide a filling conduit discharging through an opening near the upper end of the tube 20 into the annular space A.

This filling conduit extends to the lower end of the cylinder 2 and may face either the inside or outside face of the hub. Suitable means are provided in the side plate 9ª to enable a plug being withdrawn to inject the oil required in the cylinder 2 and replacing the same. The opening in the side plate 9ª being closed by a screwed plug or other suitable means.

To inflate the suspension device, air under pressure may be supplied from any convenient source. A preferred method being by a compressor driven by the engine or motor supplying air under pressure to a reservoir from which the suspension devices of the vehicle are supplied with air, as required. Provision may be made for automatically unloading the air compressor, when the air in the reservoir reaches its normal pressure and putting it into action again, when the pressure in the reservoir falls a predetermined amount. In lieu of the above, I may utilize the pressure of the exhaust gases from the engine of the vehicle through suitable reservoir.

To supply air under pressure to the said device in the plane of the wheel, from the source of supply, and at the same time permit of the wheel being taken off its axle without difficulty, I provide an air duct or conduit 32 passing through the guide block 6 above mentioned, and terminating at the face 6$^d$ of the guide block 6 where it connects with the air control valve 33 attached to the said plate 6$^d$.

Air under pressure from the pump or reservoir on the vehicle is supplied to the said control valve 33 by means of a flexible hose and union connections. The air duct or conduit 32 which passes through the guide block 6, communicates with the air reservoir 17 by means of pipe 34 having union connections 35 and 36 adapted to connect the conduit 32 with an opening in the boss 37 of the cap 30.

To automatically regulate (or self control) the pressure of air contained in the supporting devices, I provide a control valve attached to the guide block face 6$^d$.

This valve may in some cases control the inlet of air alone, the outlet being regulated by a separate "blow off" valve actuated by the relative movement of the piston and cylinder of the device, in such manner that when the piston is forced by the excess pressure of air contained in the device, due to any decrease in the load supported thereon, to the upper end of the cylinder and into the dashpot, it shall actuate the said valve at a predetermined position of the displacement. As the pressure reduces the piston will reassume its normal position and the valve be allowed to close.

In the arrangement shown in Fig. 1, the valve 33 is adapted to control both supply of air to and the escape from the device.

According to this arrangement of my invention, I attach to the guide plate 6$^d$ of the cylinder 2 of the device, or parts connected therewith (preferably such parts as are readily accessible) a small diameter cylinder 38 containing a piston 39 fitted with suitable packing 40 to maintain it air tight in the cylinder 38, forming an air control spring. Said piston 39 is connected to the other member of the suspension device, viz., the piston 1 carrying the vehicle and load, by means of a hollow piston rod 41 passing through the top of said cylinder 38.

Operating inside of said piston rod 41 and engaging with the lower extremity of said rod, there is provided a telescoping rod 42 or connection, extending through the cylinder 38 and passing through the bottom of same, by means of a packing gland or collar 43, attached to and operating an air inlet and outlet valve or valves 33 communicating with the device by conduit 32. The valve 33 may be in the form of a piston valve, preferably attached to the lower part of the control cylinder 38, ports and connections thereto being provided to admit air under pressure from the source of supply on the car or vehicle to the suspension device, and also to allow air to escape from the said device.

The piston 44 operating in the control valve 33 is connected to the said rod 42, or other connection extending through the cylinder bottom 38, and is adapted to be operated by the action of the piston 39 in the air control cylinder 38.

The valve piston 44 is provided at its upper and lower face with suitable packing 45 to maintain it air tight. Above and below said piston 44 sufficient space is provided to admit of it moving up and down, from its normal position the extent required to open either the air inlet 46 to the suspension device or to allow air to escape from outlet 47, when the piston is moved in the opposite direction, the space above the piston being in communication by means of a small adjustable orifice or opening 48 with the cylinder 38 of the air control spring, and the space below being vented by apertures 49 to the atmosphere. There may be provided on the upper face of the valve piston 44, or at other suitable position, a spring 50, which when fully extended holds the valve piston in its normal position, such spring being compressed only when the valve piston rises above its normal position. The valve piston 44 may have a single or more passages 51 through the body of or around the periphery of the same, so disposed that when the piston is raised a predetermined amount above its normal "off" position, said passage permits air to pass from port 47 on one side of the valve barrel 33 communicating with the suspension device, to port 52 on the other side which opens to atmosphere, thus allowing air to escape from the device; similarly when the valve piston 44 is forced downward a predetermined amount from its normal position, said passage 51 permits air to pass from the port 53 on the one side of the valve barrel 33 to port 46 on the other side, the port 53 being in communication with a source of supply of air under pressure thereby allowing air to pass to the suspension device. The cylinder 38 of the air control spring is provided with air ports communicating with the atmosphere at a convenient point, preferably—in this arrangement—just below the piston 39 or packing 40 of same when it is in the average position of suspension.

The valve piston 44 is required to have sufficient friction in its movement in the barrel of the valve 33 to overcome the weight —or tendency of the weight—of the piston 44 to cause it to drop and to maintain it in the position to which it has been moved, by the relative motion of the piston 1 in the cylinder 2 of the suspension device.

In operation, when the vehicle is in motion, and the device is automatically inflated, with the piston 1 in its normal position of suspension, any small displacement of the latter within the cylinder 2 will not materially increase the normal pressure of the air supporting the load. The suspension is therefore, operating under the most sensitive condition, within a zone or displacement limited by the distance the piston may descend in its stroke or by throttling the air passages from the annular space A, as the wall 16$^a$ begins to telescope with the tube 20, the passage becoming more restricted as the piston descends, until finally the annular space A is cut off from the interior of the piston, cylinder or reservoir, and the pressure of air confined in the annular space A therefore, rises rapidly due to the diminished space and acts as a supplementary dash-pot coming finally into operation to prevent final concussion, should the vehicle meet with considerable shock, or should the device become deflated through leakage.

Small vents may be provided in the face of the piston, or the ferrule into which it engages, the confined air may slowly escape, and if the impetus be great enough to cause the piston to be forced to the lowest position of its stroke, the shock may be finally dissipated on the oil located at the bottom of the annular chamber A, by forcing the same through said vent or holes, which oil, when the piston resumes its normal position will return by gravity to the annular chamber A. As these vents are mere matters of ordinary machine-shop practice, so far as construction is concerned, they are not clearly illustrated here.

When the device is deflated and the lower face of the piston rests in the oil in the dash-pot A, and air is then supplied to the device for inflation, the incoming pressure of air will be effectively exerted on the full area of the piston through the vents 23.

In operation, the space between the upper face of the piston 1 and cylinder 2, is not only used as a dash-pot to arrest the excessive upward rebound of the piston 1 in its cylinder 2, but also to circulate oil to lubricate and assist in maintaining cup leather 11 or piston packing air tight in the cylinder. As the piston 1 descends in the cylinder 2 against the pressure of air, a partial vacuum is created in the upper dash-pot causing oil to flow from the reservoir 13$^a$ through valve 14$^a$ into the said dash-pot. On the return stroke or rebound of the piston, the valve 14$^a$ is closed and the piston covers the air port 14, the pressure of the air in the dash-pot acting on the oil forces it through passages 15$^a$ and grooves 15$^b$ on the face of the piston, into the lower groove 15 at the back of the cup leather 11.

As the piston operates in its cylinder, the oil escaping from between the piston and cylinder at 8$^a$, together with any oil that may have collected from the upper face of the piston, finds its way through the ports 8 and falls into the outer revolving hub 9, being then carried up to the upper end of the cylinder where it is returned to the reservoir 13$^a$ by the scraper 13$^b$ to be again circulated in the manner before described.

The air confined in the upper dash-pot after the piston has covered the ports 14 cushions any excessive rebound of the piston in the cylinder.

Referring now to the operation of the automatic control valve for regulating the supply of air to and from the device, when the load on the vehicle is increased and is supported on the piston 1 (see Figs. 1 and 3) of the pneumatic suspension device, it will settle down in the cylinder 2, and, therefore, the piston 39 of the air control spring will also be forced downward in the cylinder 38, closing the ports thereof and compressing the air contained therein, such increased pressure will cause part of the air to pass through the reduced orifice or aperture 48 to the upper side of the piston 44 of the valve 33, thereby forcing the same downward until the air inlet ports 53 and 46 are placed in communication with the device by means of the passage or groove 51 in the valve piston. As the air passes into the device and so increases the pressure therein, the piston 1 supporting the load in the suspension device rises to its normal position, and, simultaneously, the piston 39 in the air control spring cylinder 38 rises until the shoulder 54, formed at the lower end of the hollow piston rod 41, comes into contact with the head 55 formed on the upper end of the valve rod 42 or other connection, the latter being connected with the valve piston 44, so that it is raised and the air supply shut off quickly in a definite manner, approximately as the piston 1 just reassumes its normal position of suspension.

Provision is made for free communication of air between the hollow piston rod 41 and the cylinder 38. By this positive action of closing the air inlet valve, it is not necessary for the piston 1 in the device to rise or be displaced above its normal position to close the valve 33; in some instances much displacement is not practicable, due to the employment of a rebound dash-pot on the piston 1 for the purpose of limiting the amount of such upward displacement; the displacement between the average position of suspension and the position at which the rebound dash-pot comes into action being in many cases small. In order that every displacement of the piston 1 in the cylinder 2 of the device, and therefore of the piston 39 of the air control spring, due to vibration caused by meeting obstruction in the road, shall not actuate the valve piston 44 and open the supply ports, and that such action shall only take place due to changes in the load supported, or loss of air from the device, the motion of the piston 44 which has sufficient friction in its valve barrel 33 to maintain it in the position to which it has been moved is made sluggish in this arrangement by "wiredrawing" of the air forming the air spring of the control, as it passes from the cylinder 38 into the upper space above the valve piston 44, so that the air pressure necessary to overcome the resistance or friction of the valve 44 rises slowly thereby damping the action of the piston 1 valve. If the displacement of the piston 1 in the suspension device is due to vibration from the road, the air passed from the control cylinder 38 to the face of the valve piston 44 will not be sufficient to actuate the inlet valve before the piston 1 has reassumed its normal position in the cylinder 2 of the device, hence there is little or no action on the valve 44 to move it from its "off" position to the position giving access to pressure except by the more or less permanent changes acting over a longer period than that of an oscillation or vibration.

Should the load be reduced then the air pressure in the cylinder 2 of the device will be greater than that required to balance and support the load in its most efficient state of suspension; the piston 39 of the control spring will then be forced to the upper portion of its cylinder 38 and will, in some cases, be arrested before reaching the limit of such displacement, by the dash-pot of the suspension device; the disposition of the said dash-pot between the upper faces of the piston 1 and cylinder 2 is preferably arranged to admit of the piston 1 rising upward a predetermined amount just sufficient to enable the piston 39 of the air control spring to raise the valve piston 44, by means of rod 42 or other connection supporting and actuating the piston 44 of the valve, such rod 42 and head 55 resting on the lower collar 54 of the telescope piston rod 41. The piston valve 44 in this position permits air from the device to escape by means of ports 47 in the barrel of the valve 33, and the passage 51 through the piston 44 and escape ports 52 in the opposite side of the valve 33. In this manner air escapes from the device so long as the ports face each other, but as the pressure falls piston 1 supporting the load descends to its normal position of suspension, and as it descends piston 39 in the air control spring also falls, thereby tending to leave the collar 55 of the rod 42 or other connection of the valve piston, the latter is therefore free to reassume its normal "off" position by the action either of the air control spring or of the spring 50 located between the top of the valve piston 44 and the bottom of the control cylinder 38, such motion of the valve piston 44 being controlled and regulated by the position of the piston 1 supporting the load in the device.

The air control device may be attached—where such suspension devices are located in the plane of the wheels of the vehicle—either inside the casing or outer hub 9 of the wheel, to the cylinder carrying the same, or it may be—and is preferably as shown—disposed outside of the hub 9 attached to the guide plate 6$^d$ or extension thereof, which is connected with the cylinder 2 of the device, and forms the rubbing surface for the dust plate 6$^c$ to operate against; when the control valve is so disposed the piston 41 of the air control valve may be conveniently secured to the dust plate 6$^c$ attached to the axle 3 carrying the piston 1 of the suspension device.

The hollow rod 41 of the control device is provided at the top extremity with a shoulder 56 adapted to engage with and allow the rod 41 being secured to the arm 57 attached to the axle 3 or the piston of the device, and with a screw plug 58 to secure the piston rod 41 to said arm 57 and admit of the rod or valve spindle 42 being introduced into position. Said plug 58 also acts as a stop to force valve 44 open when the device is deflated, by resting on valve head 55.

In the modification Fig. 2 I provide a system of control having a valve of the piston type 44 disposed or attached to cylinder 2, or its parts 6$^d$, such valve being adapted to allow air under pressure to enter the device when the piston 42$^a$ is displaced downward to a predetermined position, and vice versa, when displaced upward to a predetermined position, to allow air to escape from the device.

The valve 44 may be fitted with suitable packing 45, and sufficient space is provided to admit of the required displacement of the piston 44 both up and down from its normal position. In the lower space I provide oil 33ª or other suitable fluid, such fluid being in communication with an annular chamber 35ᵇ surrounding the lower portion of the valve chamber 33 through a restricted orifice 48ª, the upper portion of the annular chamber being in free communication with the atmosphere. The upper end of the valve barrel 33 is closed by a cap 33ᵇ, which also acts as a guide for the connecting rod 42 whereby the valve is operated. At the upper end of the spindle 42 of the valve piston 44 there is a piston 42ª adapted to engage the cylinder or tube 38ª having at its upper end a lug 38ᵇ, by which it is secured to the arm 57, axle 3 or piston 1 of the suspension device. The lower end of the cylinder 38ª is provided with a cap 38ᶜ screwed to said tube 38ª which forms a guide or collar for the connecting rod or spindle 42, and is adapted to engage with the back or the lower side of said piston 42ª.

The upper face of the piston 42ª is provided with suitable packing 40ª secured in any suitable manner. Ports 54ª are provided in the wall of the said control cylinder 38ª.

In operation, when the load is increased on the vehicle, the piston 1 supporting the same in the device descends in the cylinder 2, forcing the control cylinder 38ª also to descend, thereby cutting off the communication through the ports 54ª and compressing the air contained therein. The pressure acting on the face of the piston 42ª forces the same downward against the resistance of the oil 33ª on the underside of the piston valve 44, which oil is now forced comparatively slowly into the outer annular chamber 33ᵇ, until the piston 44 permits communication between the air inlet ports 53 and the device. As air enters the device, and the pressure rises, the piston 1 supporting the load again tends to resume its normal position of suspension. As it rises, however, the lower end of the air control cylinder cap 38ᶜ engages with the back of the piston 42ª and closes the valve by raising the latter to its normal "off" position. Similarly when the load is decreased on the vehicle, the pressure in the device then becomes too great to balance the load at the most efficient state of suspension, the piston 1 carrying the load is forced to the upper part of its cylinder 2, until it is arrested by the action of the rebound dash-pot as described. As the piston rises above its normal position of suspension, it carries with it the cylinder 38ª of the control spring which raises the piston 44 in the valve 33 by means of the spindle 42ª, until the air outlet ports 47 and 52 are covered by the groove or passage 51 in the piston, thus allowing the excess pressure to escape. As the piston 1 of the device settles back to its normal position, said valve may be closed by the action of a properly disposed spring on the top side of the valve piston 44, such closing being controlled by the movement of the piston in the device.

Should the piston 1 supporting the load in the device, be displaced, owing to vibration caused from obstruction in the road, it will compress the air contained in the air control spring 38ª, after cutting off the ports 50ª communicating with the atmosphere. But before the pressure due to such compression can communicate motion to the piston 44, the piston 1 of the device, and therefore that of the control, will reassume their normal positions, so that little motion, if any, is given to the valve.

It is also obvious that the valve may be attached to the piston or its parts of the suspension device and be operated by the other member of the device, viz., the cylinder or its parts, without departing from the scope of the invention.

Referring to Fig. 4:—This figure illustrates a modified suspension device wherein the piston supports the vehicle and load on air under pressure in cylinder 2 of the device through pivotal connections 59 secured through brackets 60 to the side frame of the vehicle, the cylinder 2 being preferably divided into two parts and secured by bolts passing through flanges 61 and 62 so permitting access to the piston packing 11ª without disturbing the connections between the cylinder and the frame of the vehicle. The piston 1 is secured at its lowest extremity to the axle 3 by means of ball socket joint 63 formed at the end of a piston rod 1ᶜ. The axle is guided in the plane of the cylinder by brackets 64 furnished with guides 6ª which engage with clamps 65 and 66 forming slippers.

On the upper face of the piston 1, I provide a cup leather 11ª secured in position in any suitable manner. Extending from the face of the piston 1 is a ferrule 20 with vertical section at its upper end. On the upper face 2ª of the cylinder 2, I provide a sleeve 16ᵇ forming an aperture 16 adapted to telescope in the manner described with ferrule 20. Between the wall of said sleeve 16ᵇ and the upper end of the cylinder 2, is the annular space forming the subsidiary dash-pot A. Vents 23ª are provided in the cylinder top 2ª adapted to release air or oil from the dash-pot A when the piston 1 enters the latter; the oil so discharged may return by running down the inverted coned cylinder top 2ª to the passage 16 and to the face of the piston. The aperture 16 also forms means of communication between the volume of air in the cylinder 2 and that of the reservoir 17ª, which in this instance is formed by an enveloping hood chamber 61ª.

Air under pressure is supplied to the device through conduit 32ᵇ which is in communication with the air control valve 33 (see Fig. 1) which may be disposed on the frame 68 of the vehicle and be actuated by the movement of the axle 3 or piston 1ᶜ of the device as described.

The opening fitted with plug 61ᵇ in the bottom of the reservoir 17ᵃ affords means for withdrawing any oil that may be forced over the top of the cylinder wall 2ᵃ through aperture 16.

The dash-pot formed between the lower faces of the piston 1 and cylinder 2, is divided into inner and outer portions the former being utilized as an air dash-pot and provided with air ports 14ᵇ in the desired position. The outer dash-pot is utilized to form an oil reservoir and pump to circulate oil to the back of the cup leather 11ᵃ or packing to lubricate and assist in maintaining the same air tight. The oil is circulated through a valve or valves 67 located in the face of the piston in the said dash-pot, such oil escaping past the piston packing 11ᵃ returning to the said dash-pot and being again circulated by the action of the piston 1 in the cylinder 2 of the device.

To maintain the inner dash pot air tight suitable cup leather packing 62ᵃ is provided between the piston rod 1ᶜ and the lower face of the cylinder 62.

In operation, assuming that the piston 1 is maintained in its normal position of suspension in the cylinder 2 of the device, by the automatic action of the air control valve 33, should obstruction met by the wheel of the vehicle on the road be great enough to drive the piston 1 sufficiently far up the cylinder 2 to cause the ferrule 20 to engage and telescope with the sleeve 16ᵇ, the retarding pressure exerted on the upper face of the piston 1 will be increased by the action of the dash-pot A thus bringing the same to rest without shock or concussion as described.

What I claim is:—

1. In pneumatic anti-vibration devices for automobiles of a type wherein a piston and coöperating cylinder are carried respectively by the axle and the hub of a bearing wheel of the vehicle together with means for maintaining a supply of air to the cylinder, a valve controlling said air supply to the cylinder adapted to be operated in one direction by air indrawn into the valve from atmosphere when the latter is moved in the opposite direction, the valve having a certain insite direction, the valve having a certain inertia of movement whereby it remains open until returned to initial position positively by movement of the coöperating piston and cylinder to a predetermined position.

2. In pneumatic anti-vibration devices for automobiles of the type wherein a piston and coöperating cylinder are carried respectively by the axle and the hub of a bearing wheel of the vehicle together with means for maintaining a supply of air to the cylinder, a valve controlling the air supply to the cylinder arranged to open a relief port to the atmosphere when the piston and cylinder approach extreme limits of their range of movement and the valve also being adapted to be operated by air that is drawn from atmosphere into the valve when the latter is moved in one direction, and forced into a chamber of the valve through a restricted opening, the valve having a certain inertia of movement whereby it remains open until it is turned to initial closed position positively by movement of the coöperating piston and cylinder.

3. In a pneumatic anti-vibration device for automobiles of the type wherein the piston and coöperating cylinder are carried respectively by the axle and hub of a bearing wheel of the vehicle together with means for maintaining a supply of air to the cylinder, a valve controlling a port to the cylinder from the supply means, and a relief port to the atmosphere, the valve having a valve control chamber, and a closure adapted to be moved to open the cylinder port by air indrawn into the control chamber and forced therefrom through a restricted opening, and having a certain inertia whereby it remains stationary until shifted to initial closed position by a positive connection with the pistons when the cylinder and piston approach the limit of their range of movement.

4. In pneumatic anti-vibration devices for automobiles of the type wherein a piston and coöperating cylinder are carried respectively by the axle and hub of a bearing wheel of the vehicle together with means for maintaining a supply of air to the cylinder, a valve controlling the air supply to the cylinder comprising a closure chamber, a closure reciprocable therein, a control chamber in communication with the closure chamber through a restricted opening and positive connections between the closure and piston whereby the closure is shifted to open a supply port to the cylinder when the cylinder and piston approach their limit of movement in one direction and to open a relief port also as the limit of motion is reached, the valve being adapted to be moved to open a port to the cylinder from the supply means by air forced from the valve chamber into the closure chamber and having a certain inertia whereby it remains stationary in such a position until positively operated.

5. In pneumatic anti-vibration devices for automobiles of the type wherein a piston and coöperating cylinder are carried respectively by the axle and hub of a bearing wheel of the vehicle, together with means for maintaining a supply of air to the cylinder, a valve controlling the air supply to the cylinder comprising a closure chamber having an inlet port and a relief port, a closure reciprocable therein, a control chamber in communication with the closure chamber through restricted openings, the valve closure being adapted to successively uncover the inlet and relief ports thereof, the valve closure being adapted to be moved to open the cylinder port by air indrawn into the control chamber from atmosphere and forced therefrom through the restricted openings and having a certain inertia whereby it remains stationary until positively operated, and a stem from the closure adapted to be positively engaged by the piston to shift the closure to open first the supply port and then the relief port when the cylinder and piston approach their limit of movement.

In testimony whereof I affix my signature in presence of two witnesses.

GEORGE WILLIAM BELL.

Witnesses:
ANNA M. DORR,
C. R. STICKNEY.

Copies of this patent may be obtained for five cents each, by addressing the "Commissioner of Patents, Washington, D. C."